United States Patent
Raghav

(10) Patent No.: US 10,805,762 B2
(45) Date of Patent: Oct. 13, 2020

(54) LOCATION BASED ACCESS CONTROL FOR ARTIFICIAL CONVERSATIONAL ENTITIES

(71) Applicant: Microsoft Technology Licensing, LLC, Redmond, WA (US)

(72) Inventor: Amritansh Raghav, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/107,467

(22) Filed: Aug. 21, 2018

(65) Prior Publication Data

US 2018/0359602 A1    Dec. 13, 2018

Related U.S. Application Data

(63) Continuation of application No. 15/248,148, filed on Aug. 26, 2016, now Pat. No. 10,064,006.

(51) Int. Cl.
| | |
|---|---|
| *H04W 4/021* | (2018.01) |
| *H04W 4/029* | (2018.01) |
| *H04L 12/58* | (2006.01) |
| *H04W 4/12* | (2009.01) |
| *H04W 4/20* | (2018.01) |
| *H04W 4/02* | (2018.01) |
| *H04W 4/06* | (2009.01) |
| *H04W 4/18* | (2009.01) |

(52) U.S. Cl.
CPC ............. *H04W 4/021* (2013.01); *H04L 51/02* (2013.01); *H04L 51/04* (2013.01); *H04L 51/20* (2013.01); *H04W 4/029* (2018.02); *H04W 4/12* (2013.01); *H04W 4/20* (2013.01); *H04W 4/02* (2013.01); *H04W 4/023* (2013.01); *H04W 4/06* (2013.01); *H04W 4/18* (2013.01)

(58) Field of Classification Search
CPC ......... H04W 4/02; H04W 4/023; H04W 4/06; H04W 4/20; H04W 4/12; H04W 4/18
USPC ............................................ 455/414.1–414.3
See application file for complete search history.

(56) References Cited

U.S. PATENT DOCUMENTS

| | | | |
|---|---|---|---|
| 2005/0055416 A1* | 3/2005 | Heikes | H04L 51/04 709/207 |
| 2007/0254669 A1* | 11/2007 | Katz | G01C 21/20 455/445 |

(Continued)

OTHER PUBLICATIONS

"Preinterview First Office Action in U.S. Appl. No. 16/218,304", dated Mar. 22, 2019, 5 Pages.

(Continued)

*Primary Examiner* — Jaime M Holliday
(74) *Attorney, Agent, or Firm* — NovoTechIP International PLLC

(57) ABSTRACT

Systems, methods, and software technology for providing access control with respect to bots is disclosed herein. In an implementation, an access control service monitors a location of a device with respect to a geographic area. In response to when the device has entered the geographic area, the service grants a bot associated with the geographic area with access to the device. The service may grant the bot with continued access to the device if an end-user conversed with the bot while it had access. However, the service may deny the bot the continued access to the device if the end-user did not converse with the bot.

20 Claims, 10 Drawing Sheets

(56) References Cited

U.S. PATENT DOCUMENTS

| | | | |
|---|---|---|---|
| 2010/0197219 A1* | 8/2010 | Issa | H04W 4/029 455/3.06 |
| 2013/0144961 A1* | 6/2013 | Park | H04L 51/046 709/206 |
| 2014/0358612 A1* | 12/2014 | Sri | G06Q 30/016 705/7.15 |
| 2015/0288633 A1* | 10/2015 | Ogundokun | H04L 51/12 709/206 |
| 2016/0267516 A1 | 9/2016 | Walz et al. | |
| 2017/0180276 A1* | 6/2017 | Gershony | H04L 51/02 |

OTHER PUBLICATIONS

"Final Office Action issued in U.S. Appl. No. 16/218,304", dated Aug. 21, 2019, 25 Pages.

"Office Action issued in European Patent Application No. 17761389.0", dated Jun. 19, 2020, 6 Pages.

* cited by examiner

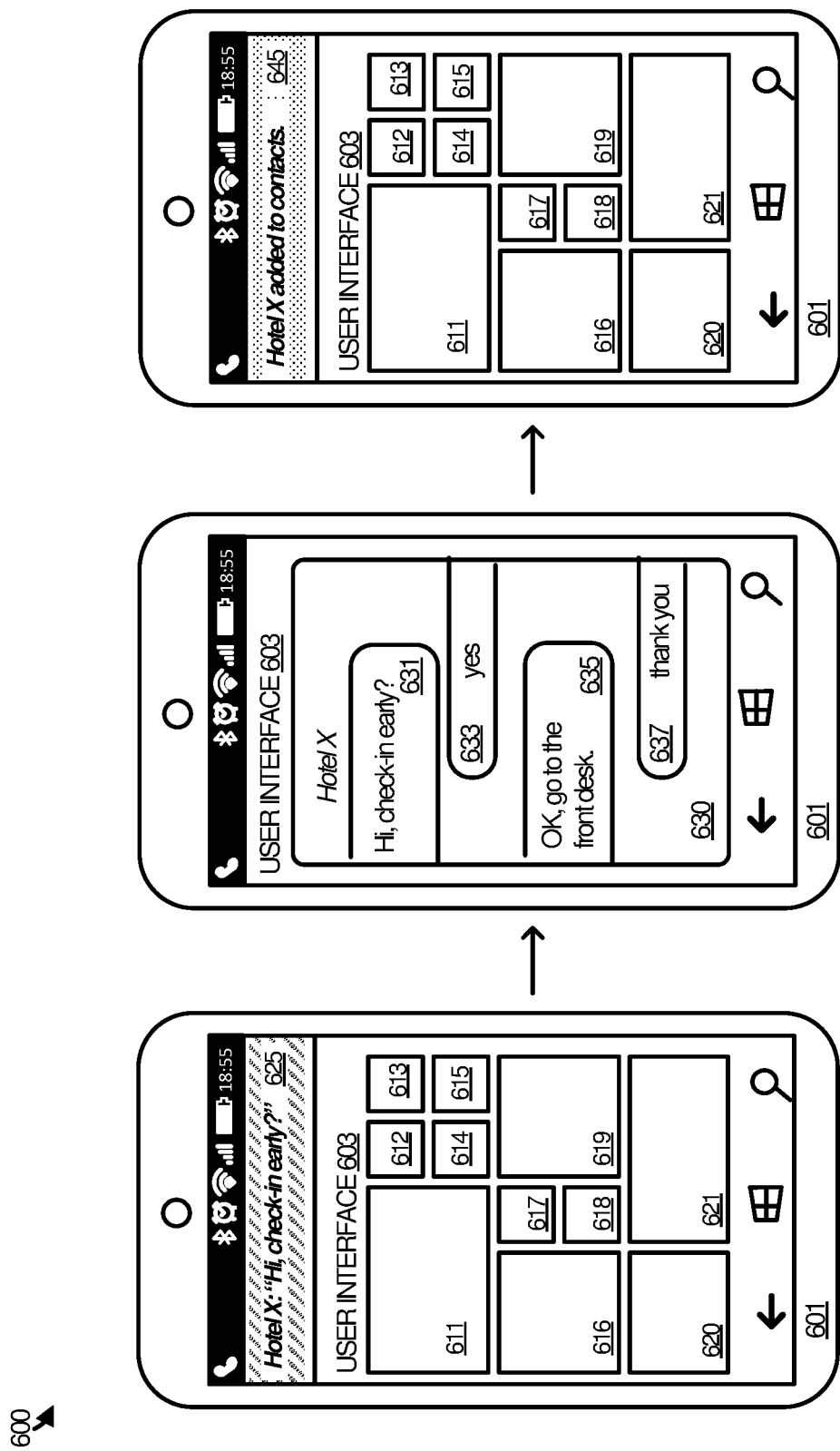

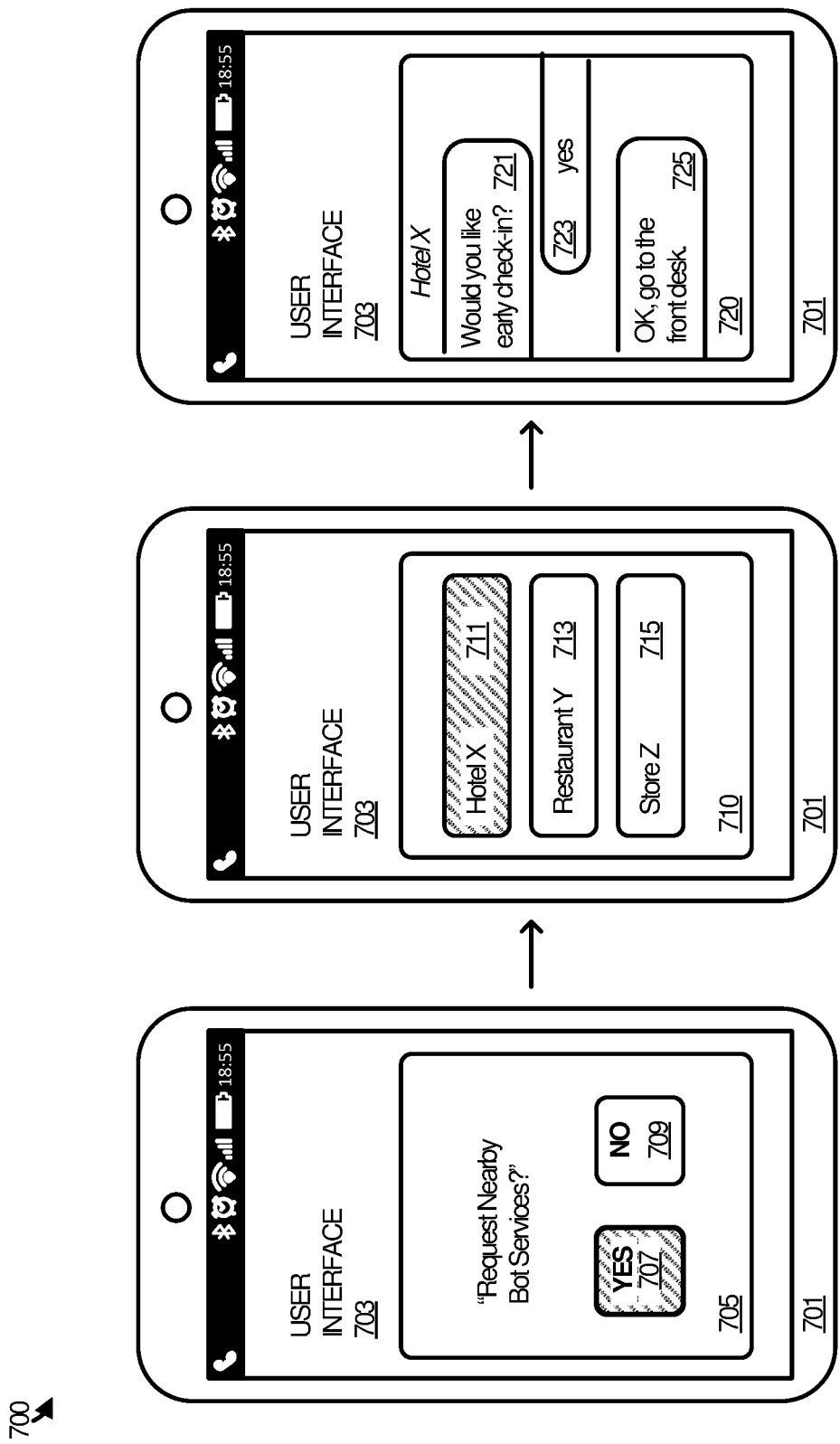

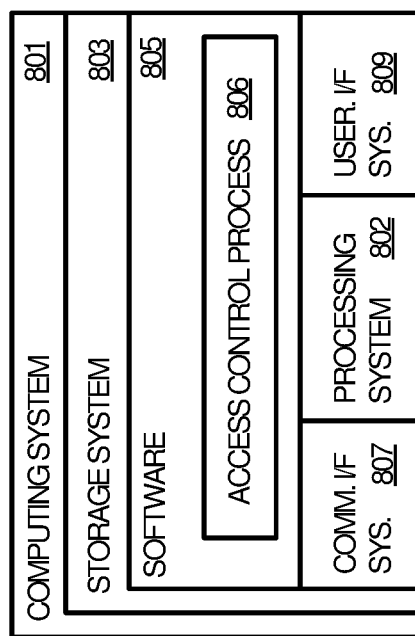

LOCATION BASED ACCESS CONTROL FOR ARTIFICIAL CONVERSATIONAL ENTITIES

RELATED APPLICATIONS

This application is a continuation of, and claims priority to, U.S. application Ser. No. 15/248,148, entitled LOCATION BASED ACCESS CONTROL FOR ARTIFICIAL CONVERSATIONAL ENTITIES, filed on Aug. 26, 2016, and which is hereby incorporated by reference in its entirety.

TECHNICAL BACKGROUND

Artificial conversational entities, or conversation bots, are computer programs that engage with end users in conversations. A messaging bot is type of conversation bot that converses with end users through text messaging, for example. Conversational bots have proliferated in recent times and are becoming common features of the communication landscape, serving in a variety of operational circumstances and situations.

For example, airlines may utilize customer service bots to provide customer service to end users through their text messaging applications, in lieu of phone calls. Retail organizations may utilize shopping bots to assist users with searching for and purchasing goods and services. In most of these cases, the use of a bot relieves the end user of having to reach a party through a dedicated website or application. Rather, the end user can simply converse with a commercial entity's conversational bot using a messaging application or other such general purpose communication tools.

While relatively popular with end users, the potential over-proliferation of bots may at times result in sub-optimal device performance and sub-optimal user experiences. Bots presently enjoy almost unfettered access to end users, so long as a given operational entity behind a bot has a user's contact information. For example, a bot can be deployed to text an end user repeatedly, and at inopportune moments, at little to no cost to its operator. Such communications can waste device resources, such as battery life and processing power, and are especially frustrating to users when originating from contextually irrelevant bots.

OVERVIEW

Access control technology is disclosed herein that controls the access of bots to communication applications based on location and engagement levels. In an implementation, an access control service monitors a location of a device with respect to a geographic area. In response to when the device has entered the geographic area, the service grants a bot associated with the geographic area with access to the device. The service may grant the bot with continued access to the device if an end-user conversed with the bot while it had access. However, the service may deny the bot the continued access to the device if the end-user did not converse with the bot.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 6 illustrates a user experience in an implementation.

FIG. 7 illustrates a user experience in an implementation.

FIG. 8 illustrates a computing system suitable for implementing the access control technology disclosed herein, including any of the architectures, elements, processes, and operational scenarios and sequences illustrated in the Figures and discussed below in the Technical Disclosure.

TECHNICAL DISCLOSURE

Figure 1A:
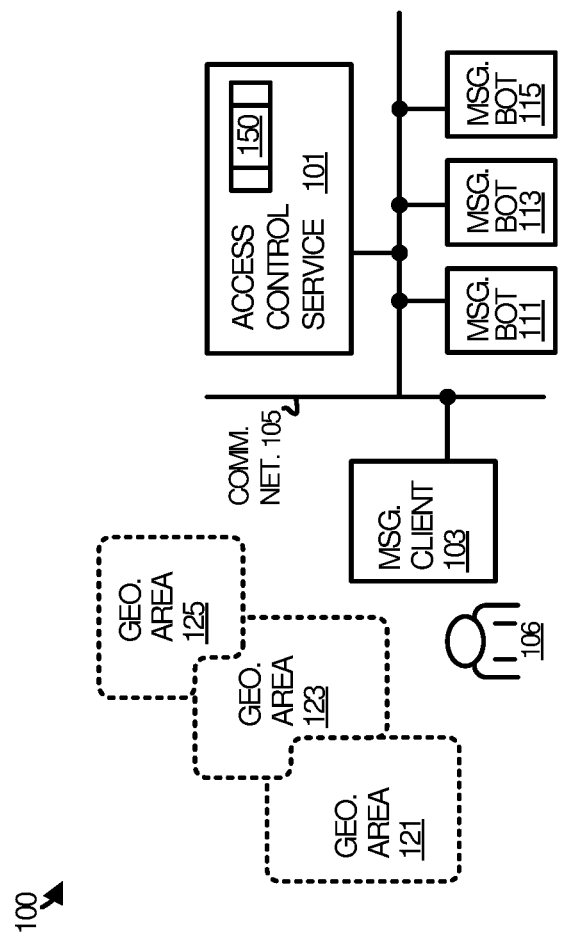
FIG. 1A illustrates an operational environment in an implementation of access control for messaging bots.

Access control technology is disclosed herein that provides messaging bots with location based access to messaging clients (and their associated end users). The access is maintained or restricted based on a level of engagement that a given bot may achieve with respect to a conversation with an end user. Such geo-fencing technology for messaging bots allows a geographically relevant bot to be surfaced to an end user, while also mitigating the occurrence of nuance interactions that may result in sub-optimal device performance and poor user experiences. When a user leaves a geographic area, the bot or bots that had access to the user will no longer, unless warranted by their level of engagement in a conversation.

In an implementation, messaging bots are registered with an access control service such that each bot is associated with one or more specific geographic areas. The geographic areas may be defined in terms of places, zip code, geographic boundaries, specific coordinates, or any other suitable mechanism. To register a messaging bot, an operational entity associated with the bot interfaces with the access control service to submit registration information that identifies the geographic area to be linked to their bot. The registration information may also include contact information for notifying the bot or some other element associated with the operational entity when an end user has entered their area.

The access control service monitors the location of messaging clients and evaluates whether or not a given messaging client is in an area associated with a messaging bot. When a messaging client enters an area associated with a bot, the access control service responsively grants the messaging bot with access to the messaging client. This may include, for example, providing a service handle or alias with which to communicate with the messaging client.

The bot can then initiate a conversation under the initial access granted to it by the access control service. However, the access control service monitors the communications sent from and/or to the messaging bot and evaluates a level of engagement (or lack thereof) on behalf of the target user. If the user is responsive to the conversation as indicated by a reply or reply messages, then the messaging bot is granted continued access subsequent to its initial attempt to start the conversation. In some implementations, a contact for the bot may even be added to the end user's contacts if the level of engagement is sufficient.

However, if the end user generally ignores the messaging bot, as indicated by a lack of reply messages, then any subsequent access may be disallowed, restricted, or otherwise prohibited by the access control service, even if the messaging client remains in the geographic area associated with the messaging bot. This may prevent nuance communications and optimize device performance, but may also provide an opportunity for other messaging bots to contact the user.

For instance, if the first bot is ignored by the user, then the access control service may notify a second bot associated with the same geographic area that the messaging client is present and available. The second bot may then attempt to initiate a conversation.

If a user ignores one or more bots upon entering a geographic area, the bot may be prevented from accessing the user's messaging client even when the messaging client re-enters the same area. Timers may be employed in some situations to ensure that the re-entry is close enough in time to the initial entry to warrant the restricted access. If a user re-enters an area at a much later time, then a bot that was previously ignored may still be granted access due to the amount of time elapsed since the occurrence.

As mentioned, a selected bot may be provided with the service handle for a specific messaging client, thus allowing the bot to communicate directly with the messaging client through a messaging service. However, such an arrangement may leave the messaging client susceptible to unauthorized contact by a messaging bot outside of a particular geographic boundary. Aliases may be used to mitigate such problems and to ensure the privacy of a messaging client and associated end user. For example, an alias for an end user could be provided to a messaging bot and the alias translated by either the access control service or some other element in the messaging service, in order to deliver a message or messages to a targeted messaging client.

A messaging bot could be restricted from communicating with a messaging client in a variety of ways, including changing the messaging client's alias. Thus, if an alias expires after a certain amount of time, and if a messaging bot is not provided with a new alias, then the bot is effectively restricted from communicating with the client.

In another example, either the access control service or another element in a messaging service could provide a filtering and blocking function. The access control service could inspect incoming messages for an originating identifier and a destination identifier. If the messaging bot from which the message originates is not allowed to contact the messaging client associated with the destination identifier, then the access control service could delete or block the message, reply to the sender to refrain from sending any more messages, or take other corrective action that would prevent the bot from accessing the client.

FIG. 1A illustrates an operational environment 100 in an implementation of access control for messaging bots. Operational environment 100 includes an access control service 101, a messaging client 103, communication network 105, and messaging bots 111, 113, and 115. Other elements may be included in operational environment 100, such as a messaging service, but are not shown for purposes of clarity.

Access control service 101 is representative of any service implemented in software on a suitable computing system that is capable of controlling bot access to messaging clients as described herein. Computing system 801 in FIG. 8 is representative of a computing system that may be employed to implement access control service 101. Access control service 101 may be integrated in the context of a messaging service or a larger, multi-modal communication service, but may also be implemented as a stand-alone service.

Messaging client 103 is representative of any messaging application that may be implemented on a mobile phone, tablet, laptop, or desktop computer, or any other suitable computing device. Messaging client 103 may be integrated in the context of a larger communication application or may be implemented as a stand-alone application. Examples of messaging client 103 include, but are not limited to, instant messaging applications, short messaging service (SMS) messaging applications, and other similar applications. Skype®, and Skype for Business®, Apple iMessage®, Google Chat™ and Hangouts™, WhatsApp®, and Facebook® Messenger are examples of messaging client 103.

Messaging client 103 connects to a messaging service (not shown) in order to communicate with other messaging clients on the service. Messaging bots 111, 113, 115 are representative of artificial conversational entities that may connect to the same messaging service on order to communication with messaging client 103 and other clients. In other words, messaging bots 111, 113, and 115 are themselves clients of the messaging service.

Communication network 105 is representative of any communication network or networks over which access control service 101, messaging client 103, and messaging bots 111, 113, and 115 may communicate. Examples of communication network 105 include internets, intranets, the Internet, wireless and wired networks, public and private networks, local area networks and wide area networks, and any combination or variation thereof.

Geographic areas 121, 123, and 125 are representative of distinct geographic areas that may be logically associated with messaging bots. Each area may be representative of, for example, a specific building, zip code, geographic boundary, set of coordinates, or any other identifiable geographic area.

Figure 1B:
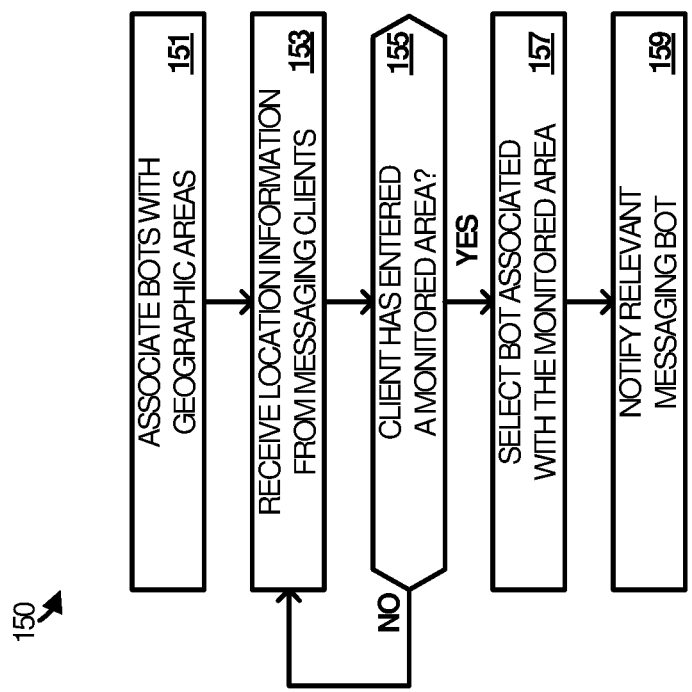
FIG. 1B illustrates a process employed by an access control service.

FIG. 1B illustrates a process 150 employed by access control service 101 in the context of providing access control over messaging bots. Process 150 may be implemented in program instructions in the context of any of the applications, application modules or components, or other such programming elements that constitute access control service 101. The program instructions direct the underlying computing system or systems that provide an access control service to operate as follows.

Referring parenthetically to the steps illustrated in FIG. 1B, an access controls service under the control of process 150 associates messaging bots with geographic areas (step 151). This may include, for example, associating a particular bot with a set of addresses, geographic coordinates, zip codes, or other such characteristics of a geographic area. The associations are made in response to requests to register a particular bot with one or more geographic areas. The requests may originate from the bots themselves, from provisioning tools or portals provided for registering bots, or even through a manual process in some situations.

As messaging clients move about, they periodically report their locations to the access control service, which is received by the access control service in the form of location information (step 153). The location information indicates the precise location of a client by geographic coordinates or a known physical address, a general location of the client by zip code, cell tower, or wireless access point, or in some other manner.

The access control service then determines if a given messaging client has entered a monitored geographic location (step 155). The access control service may, for example, determine if the coordinates or other location information reported by a client fall within the boundaries of a geographic location for which bot access control is provided. In another example, the access control service may determine if the coordinates of the client are within a certain radius from the center of the geographic area.

If the client has entered a monitored area, then the access control service selects a messaging bot associated with the area (step 157). When just a single messaging bot is associated with a geographic area, that bot is selected. When multiple messaging bots are associated with the geographic area, then the access control service may engage in a prioritization process, a bidding process, or some other mediation to select one of the messaging bots. More than one bot may be selected in some cases.

Having selected the messaging bot, the access control service notifies the bot that access has been granted to it in order to initiate a conversation with the messaging client (step 159). Notifying the bot may include, for instance, providing a service handle or alias to the messaging bot with which to communicate with the client. The access control service may provide additional information, such as the location of the client or contextual information about the client known by the access control service.

Figure 1C:
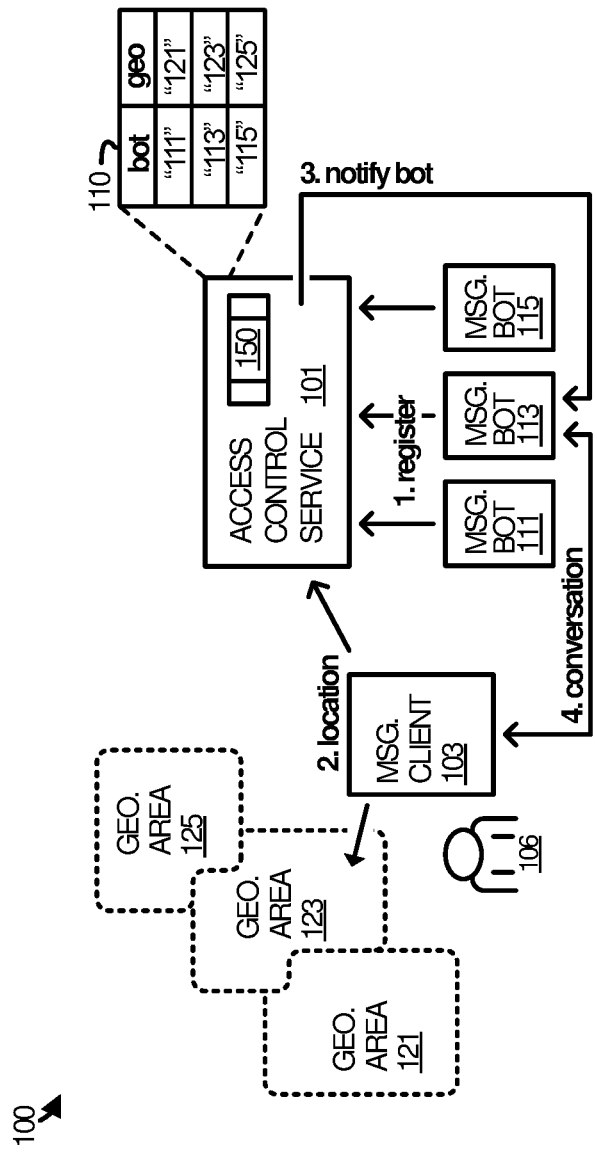
FIG. 1C illustrates an operational scenario in an implementation.

FIG. 1C illustrates an operational scenario that may occur in the context of operational environment 100, to further explain access control for messaging bots. In operation, messaging bots 111, 113, and 115 have been registered with access control service 101, and because of the registration process, associated with a specific geographic area. Table 110 is maintained by access control service 101 and indicates the specific associations provided for in this example. While the associations represented in table 110 are 1:1 (one bot for each geographic area), it may be appreciated that more than one bot could be associated with a single geographic area. In this example, messaging bot 111 is associated with geographic area 121; messaging bot 113 is associated with geographic area 123; and messaging bot 115 is associated with geographic area 125.

Messaging client 103 periodically reports its location to access control service 101. Messaging client 103 may indicate its location in terms of a latitude and longitude coordinates, the identity of a base station serving the underlying device on which messaging client 103 runs, or the identity of a wireless access point serving the device, for example. The client may even indicate location in terms of a specific place, zip code, or other such information, if it is at the disposal of messaging client 103. A variety of ways to indicate a location are possible and may be considered within the scope of the present disclosure.

In this example, messaging client 103 has entered geographic area 123. According, the location information sent to access control service 101 by messaging client 103 may indicate geographic coordinates that fall within geographic area 123, the name of a place or zip code within the area, or the identity of a base station or other such wireless access point within geographic area 123

Access control service 101 receives the location information and ascertains that messaging client 103 is in a location that corresponds to geographic area 123. Following from that determination, access control service 101 then also determines that messaging bot 113 is associated with geographic area 123. Accordingly, access control service 101 grants messaging bot 113 with access to messaging client 103, for at least an initial amount of time while messaging client 103 is in geographic area 123.

Having been granted initial access to messaging client 103, messaging bot 113 attempts to engage the end user 106 in a conversation. Messaging bot 113 may send messaging client 103 a message that expresses a greeting, provides an introduction, or otherwise attempts to capture the attention of end user 106.

If end user responds and engages messaging bot 113 in a conversation, then access control service 101 may grant messaging bot 113 with subsequent access to allow the conversation to continue. Access control service 101 detects a level of engagement on the conversation by monitoring the back and forth messaging flow between the client and the bot.

In some cases, end user 106 may ignore messaging bot 113 entirely, in which case access control service 101 refrains from granting any subsequent access. However, if messaging client 103 replies promptly to messaging bot 113, replies regularly, or otherwise behaves in such a way that indicates a sufficient level of engagement in the conversation, then access control service 101 provides the subsequent access. This may be accomplished by, for example, refraining from blocking any message, refraining from changing the alias for messaging client 103, or in the case of a changed alias, updating messaging bot with the new alias. The subsequent access may be maintained even if messaging client 103 departs from geographic area 123, so long as the level of engagement of end user 106 remains sufficient.

Access control service 101 may prevent some messaging bots from accessing a client even upon re-entry by the client to a geographic area. For instance, were end user 106 to ignore messaging bot 113, depart from geographic area 123, and then re-enter geographic area 123 at a later time, access control service 101 may refrain from granting any initial access to messaging client 113. Such a re-entry scenario may be maintained for a certain amount of time, after which messaging bot 113 would be granted access to messaging client 103 upon its re-entry to geographic area 123.

Figure 2:
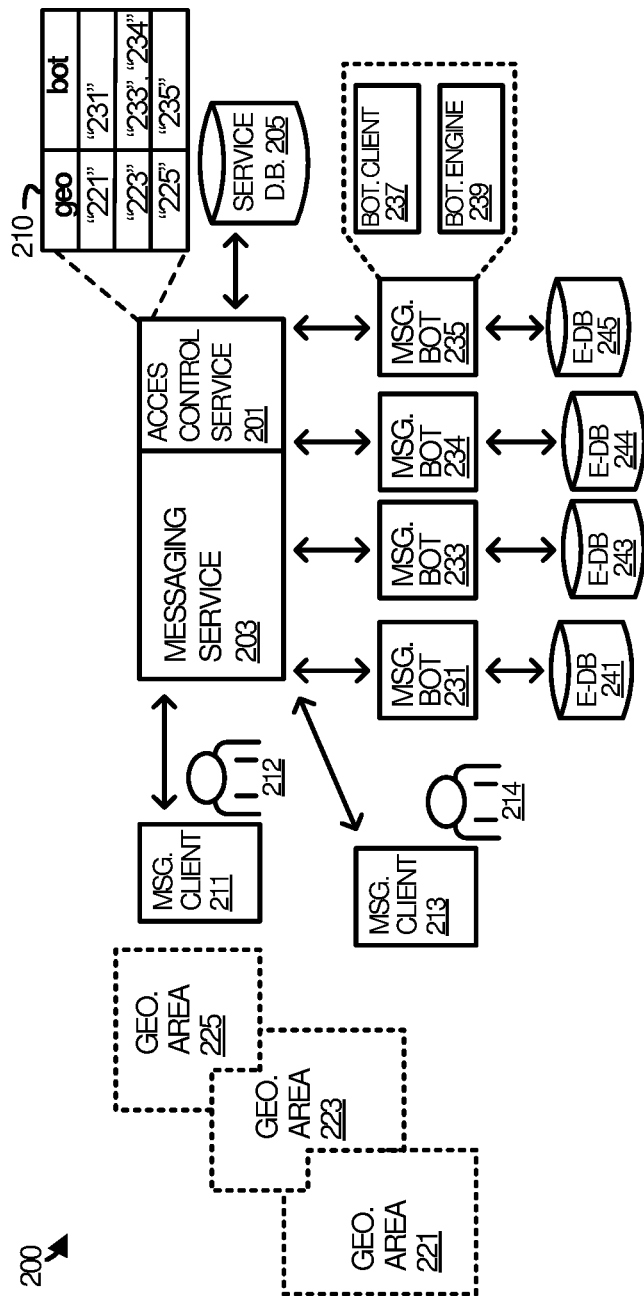
FIG. 2 illustrates another operational environment in an implementation.

FIG. 2 illustrates operational environment 200 in another implementation. Operational environment 200 includes access control service 201 and messaging service 203. Access control service 201 in communication with service database 205 and controls bot access to messaging clients on messaging service 203.

Operational environment 200 also includes messaging clients 211 and 213, and messaging bots 231, 233, 234 and 235. End users 212 and 214 are associated with messaging clients 211 and 213 respectively. Enterprise databases 241, 243, 244, and 245 are associated with messaging bots 231, 233, 234, and 235 respectively. Each messaging bot may include a bot client and a bot engine, of which bot client 237 and bot engine 239 are representative.

In operation, messaging bots 231, 233, 234, and 235 are registered with access control service 201 and thereby associated with a particular geographic location. For example, table 210 describes that messaging bot 231 is associated with geographic area 221; messaging bot 233 and messaging bot 234 are both associated with geographic area 223; and messaging bot 235 is associated with geographic area 225.

Figure 3:
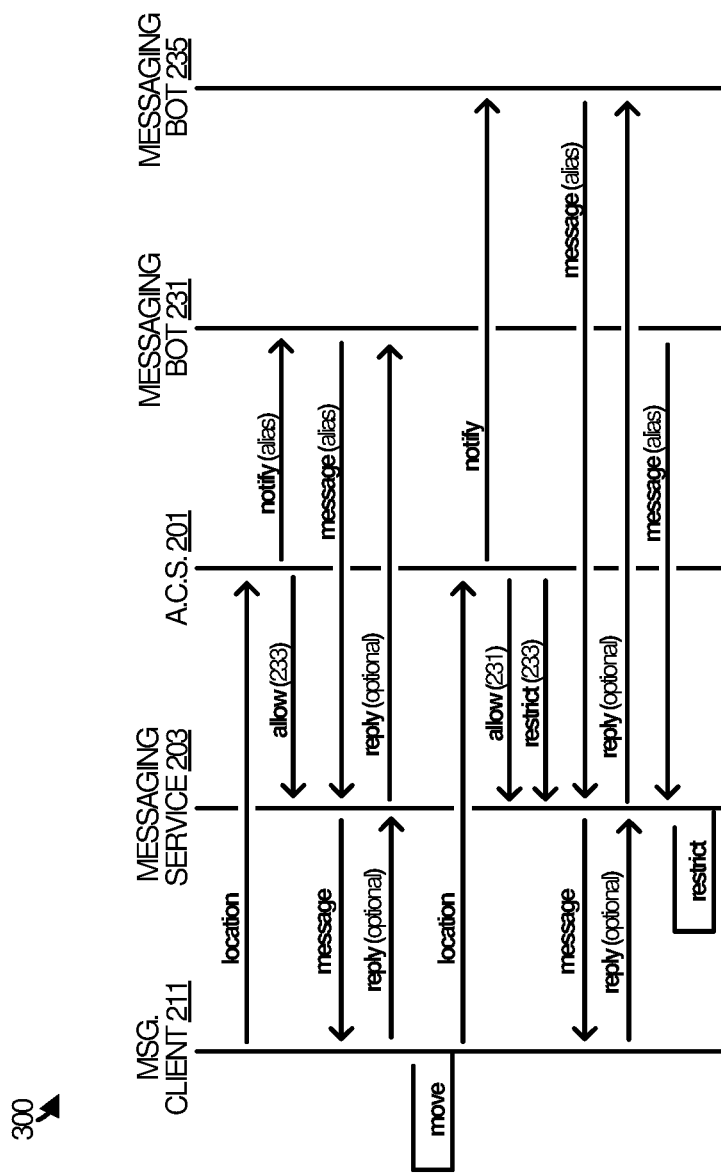
FIG. 3 illustrates an operational sequence in an implementation.
Figure 4:
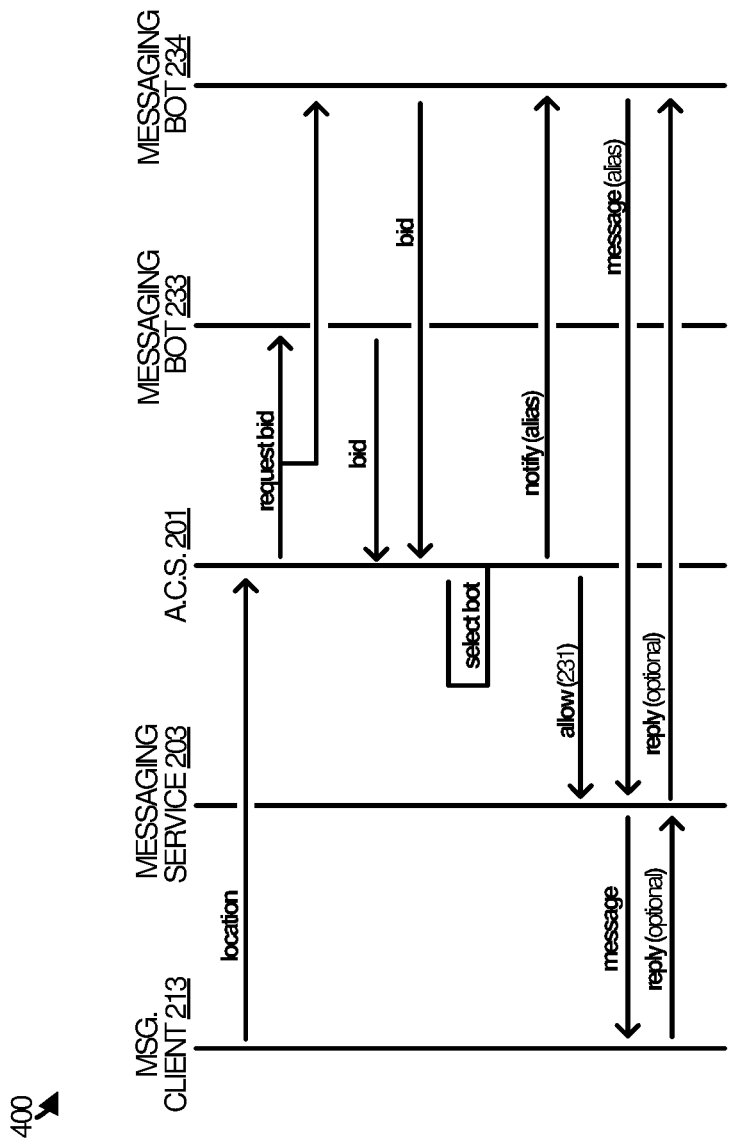
FIG. 4 illustrates an operational sequence in an implementation.
Figure 5:
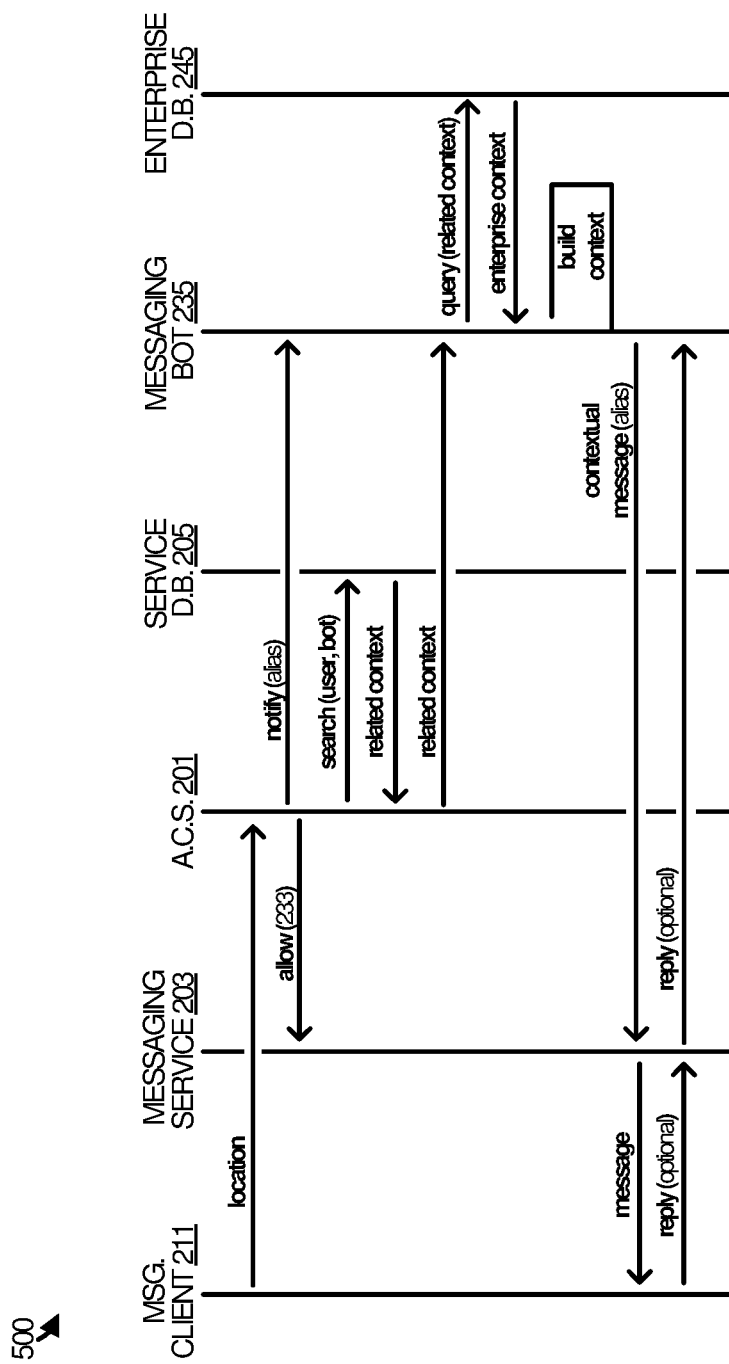
FIG. 5 illustrates an operational sequence in an implementation.

FIGS. 3-5 illustrate various operational sequences to demonstrate access control for messaging bots with respect to operational environment 200. In FIG. 3, operational sequence 300 begins with messaging client 211 entering geographic area 221. Messaging client 211 reports its location to access control service 201, which responsively notifies messaging bot 231 either directly or indirectly via some other element associated with the messaging bot 231. Access control service 201 also communicates with messaging service 203 to grant messaging bot 231 with initial access to messaging client 211.

Messaging bot 231 proceeds to communicate with messaging client 211 through messaging service 203. Messaging service 203 may apply a filter to messages addressed to messaging client 211 in order to allow or block messages from specific senders. So long as messaging bot 231 is in an access-granted state, messaging service 203 allows its messages to pass. However, if messaging client 211 fails to reply to messaging bot 231 at the outset of a conversation, access control service 201 may instruct messaging service 203 to block any subsequent messaging attempts by messaging bot 231.

Further in this scenario, messaging client 211 moves to a new location-geographic area 225. Messaging client 211 notifies access control service 201 in the normal course of operations, which triggers access control service 201 to select and notify messaging bot 234. Access control service 201 requests messaging service 203 to allow messaging bot 235 to communicate with messaging client 211, but also to block messaging bot 231.

Messaging bot 235 may henceforth converse with messaging client 211, at least for an initial period. If messaging client 211 maintains a sufficient level of engagement with messaging bot 234, the access may persist. In the meantime, messaging bot 231 is restricted from communicating with messaging client 211. Accordingly, messages sent by messaging bot 231 are blocked in messaging service 203.

In an alternative scenario, it is possible for messaging bot 231 to retain its access to messaging client 211, even when messaging client 211 leaves geographic area 221 and enters geographic area 225. This may happen when, for example, end user 212 is engaged in an ongoing conversation with messaging bot 231.

FIG. 4 illustrates another operational sequence 400 in an implementation. Operational sequence 400 beings with messaging client 213 entering geographic area 223. Messaging client 213 reports is location to access control service 201. Access control service 201 responsively determines which one or more messaging bots are associated with geographic area 223. In this example scenario, both messaging bot 233 and messaging bot 234 are associated with the area.

When two or more messaging bots are associated with a given area, access control service 201 may prioritize one over the other(s). In this scenario, a bidding processed is utilized, whereby access control service 101 (or some other associated element, such as a bid platform), requests bids from messaging bot 233 and messaging bot 234. The messaging bots 233 and 234 may then reply with bids that may be evaluated.

It is assumed here for exemplary purposes that messaging bot 234 has outbid messaging bot 233. Access control service 201 grants messaging bot 234 with access to messaging client 213 accordingly. This includes notifying messaging bot 234 and providing an alias for messaging client 213. Access control service 201 also requests messaging service 203 to allow messaging bot 234 to communicate with messaging client 213. Messaging bot 234 and messaging client 213 may then commence with a messaging conversation.

FIG. 5 illustrates operational sequence 500 in another implementation. In operational sequence 500, messaging client 211 has entered geographic area 225 and reports its location to access control service 201. Access control service 201 selects messaging bot 235 based on its registered association with geographic area 225 and responsively sends a notification to messaging bot 235 that messaging client 211 is in the area. Access control service 201 also requests messaging service 203 to allow messaging bot 235 to communicate with messaging client 211.

To enhance the conversation between messaging bot 235 and messaging client 211, access control service 201 queries service database 205 for contextual information related to messaging client 211. The query may include, for example, an identity of end user 212, an identity of the selected messaging bot (or an operational entity associated with the bot), or any other information that may be useful for retrieving context. Service database 205 replies with the contextual information, at least some of which access control service 201 provides to messaging bot 235.

Messaging bot 235 may use the contextual information to query enterprise database 245 in order to fine information about messaging client 211 or end user 212 that may assist the messaging bot 235 with building a conversational context. Enterprise database 245 returns the enterprise-related contextual information to messaging bot 235. Messaging bot 235 can then construct a conversational context from the enterprise information. This allows messaging bot 235 to construct conversational strings that reference facts relevant to end user 212, especially with respect to the presence of end user 212 in geographic area 225. Such a context may encourage end user 212 to engage with messaging bot 235 in a conversation, thereby preserving its access to messaging client 211.

FIG. 6 illustrates a user experience 600 in an implementation of bot access control. User experience 600 involves communication device 601, which is representative of a mobile phone, tablet, laptop, or any other suitable computing and communication device. A messaging application runs on communication device 601, which renders user interface 603 in its screen.

User interface 603 includes a home screen with various icons 611-621 for launching applications on the device. Each icon may correspond to an application, a contact, a file, or any other such element.

In operation, the messaging client periodically reports its location to an access control service in a messaging service. When an end user enters a geographic area that is associated with a messaging bot, the access control service identifies a geo-relevant bot and provides the messaging bot with access to the messaging client.

In this scenario, the communication device 601 has entered a geographic area associated with a messaging bot that is affiliated with a hotel. The end user may have, for example, entered a hotel property. Accordingly, the messaging bot sends an introductory message to the messaging client that is surfaced in a message notification 625 in user interface 603. The message in this instance is contextual in that the messaging bot recognized that the end user has a reservation at the hotel and that early check-in is available. Thus, the message prompts the end user if he or she would like to check in early.

Assuming that the end user interacts with the message notification 625, user interface 603 transitions to a view 630 of the messaging client. The end user proceeds to engage in a conversation with the messaging bot, as represented in messages 631, 633, 635, and 637. Such an exchange may be considered a level of engagement sufficient enough to qualify the messaging bot to be automatically added to the end user's contacts. Thus, when the messaging client is exited and user interface 603 transitions back to a view of the home screen, a contact notification 645 may be surface to alert the end user to the fact that a contact has been stored for the hotel's messaging bot. In this manner, the end user is able to navigate to a contact for the hotel bot, should he or she desire to engage in another conversation.

FIG. 7 illustrates another user experience 700 in an implementation of bot access control. User experience 700 involves communication device 701, which is representative of a mobile phone, tablet, laptop, or any other suitable computing and communication device. A messaging application runs on communication device 701, which renders user interface 703 in its screen.

In operation, the messaging client periodically reports its location to an access control service in a messaging service. When an end user enters a geographic area that is associated with a messaging bot, the access control service may alert the messaging client to the fact that a geo-fenced messaging bot (or bots) are available nearby.

The messaging client surfaces view 705 in user interface 703 that notifies the user that bot services are available and provides graphical options 707 and 709 for selecting yes or no to the services. Selecting graphical option 709 (for no) would close the view 705. Selecting graphical option 707 (for yes) transitions user interface 703 to a new view 710 that includes a list of at least some of the geo-relevant messaging bots that are available to the user. In this example, the end user has selected graphical option 707.

The identity of the messaging bots are determined by the access control service and are communicated to the messaging client for surfacing in view 710. In this example, a hotel-related bot is identified in visual element 711; a dining-related bot is identified in visual element 713; and a retail-related bot is identified in visual element 715. The end user may select any one or more of the visual elements in order to engage a given messaging bot in a conversation. In this example, the end user has selected visual element 711.

Selecting visual element 711 launches a messaging view 720 that allows the end user to engage in a chat session with the messaging bot associated with the hotel. A series of messages 721, 723, and 725 are illustrated in an example of an exchange of messages that may occur in the course of the conversation.

FIG. 8 illustrates computing system 801, which is representative of any system or collection of systems in which the various applications, services, scenarios, and processes disclosed herein may be implemented. Examples of computing system 801 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809. Processing system 802 is operatively coupled with storage system 803, communication interface system 807, and user interface system 809.

Processing system 802 loads and executes software 805 from storage system 803. Software 805 includes access control process 806, which is representative of the processes discussed with respect to the preceding FIGS. 1-7, including process 150. When executed by processing system 802 to provide access control with respect to messaging bots, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device, but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device, but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein. For example, software 805 may include program instructions for implementing an access control service (e.g. access control service 101 and 201).

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 805 may include additional processes, programs, or components, such as operating system software, virtual machine software, or other application software, in addition to or that include access control process 806. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system customized to provide bot access control. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 809 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 809. In some cases, the input and output devices may be combined in a single device, such as a display capable of displaying images and receiving touch gestures. The aforementioned user input and output devices are well known in the art and need not be discussed at length here.

User interface system 809 may also include associated user interface software executable by processing system 802 in support of the various user input and output devices discussed above. Separately or in conjunction with each other and other hardware and software elements, the user interface software and user interface devices may support a graphical user interface, a natural user interface, or any other type of user interface.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

A technical effect that may be appreciated from the foregoing description includes the improved battery life and processing power that results from the elimination of extraneous of nuisance text messages. In addition, the user experience is improved by eliminating or at least mitigating the occurrence of such bot-originated messages.

Certain inventive aspects may be appreciated from the foregoing disclosure, of which the following are various examples.

EXAMPLE 1

A method for providing messaging bots with location-based access to messaging clients, the method comprising: associating a plurality of messaging bots with a plurality of geographic areas; monitoring a location of each messaging client of a plurality of messaging clients with respect to each geographic area of the plurality of geographic areas; in response to when at least one of the messaging clients has entered a one of the plurality of geographic areas as indicated by the location of the messaging client, granting a messaging bot associated with the geographic area with initial access to the messaging client, in order to engage an end-user in a messaging conversation; and controlling subsequent access to the messaging client based at least in part on a level of engagement by the end-user with respect to the messaging conversation.

EXAMPLE 2

The method of Example 1 wherein controlling the subsequent access to the messaging client based on the level of engagement by the end-user comprises preventing the messaging bot from communicating with the messaging client when the end-user neglects to engage the messaging bot on the messaging conversation.

EXAMPLE 3

The method of Examples 1-2 wherein preventing the messaging bot from communicating with the messaging client when the end-user neglects to engage the messaging bot on the messaging conversation comprises preventing the messaging bot from communicating with the messaging client upon re-entry by the messaging client into the geographic area.

EXAMPLE 4

The method of Examples 1-3 wherein controlling the subsequent access to the messaging client based on the level of engagement by the end-user comprises allowing the messaging bot to communicate with the messaging client while the end-user remains engaged with the messaging conversation and until the end-user disengages from the messaging conversation.

EXAMPLE 5

The method of Examples 1-4 further comprising, in response to when the messaging client has entered the geographic area, identifying multiple messaging bots associated with the geographic area, identifying the multiple messaging bots to the messaging client, and receiving a selection of the messaging bot from the messaging client.

EXAMPLE 6

The method of Examples 1-5 further comprising receiving a plurality of requests to register the plurality of messaging bots with the access control service and, in response to each request of the plurality of requests, verifying an association between the messaging bot and the geographic area indicated in the request.

EXAMPLE 7

The method of Examples 1-6 further comprising, in response to the end-user engaging the messaging bot on the messaging conversation via the messaging client, sending a contact to the messaging client for contacting the messaging bot.

EXAMPLE 8

The method of Examples 1-7 further comprising identifying the messaging client to the messaging bot by an alias with which to address messages sent during the messaging conversation to the messaging client.

EXAMPLE 9

An apparatus comprising: one or more computer readable storage media; a processing system operatively coupled to the one or more computer readable storage media; and program instructions stored on the one or more computer readable storage media that, when executed by the processing system to provide messaging bots with location-based access to messaging clients, direct the processing system to at least: associate a plurality of messaging bots with a plurality of geographic areas; monitor a location of each messaging client of a plurality of messaging clients with respect to each geographic area of the plurality of geographic areas; in response to when at least one of the messaging clients has entered a one of the plurality of geographic areas as indicated by the location of the messaging client, grant a messaging bot associated with the geographic area with initial access to the messaging client, in order to engage an end-user in a messaging conversation; and control subsequent access to the messaging client based at least in part on a level of engagement by the end-user with respect to the messaging conversation.

EXAMPLE 10

The apparatus of Example 9 wherein, to control the subsequent access to the messaging client based on the level of engagement by the end-user, the program instructions direct the processing system to prevent the messaging bot from communicating with the messaging client when the end-user neglects to engage the messaging bot on the messaging conversation.

EXAMPLE 11

The apparatus of Examples 9-10 wherein, to prevent the messaging bot from communicating with the messaging client when the end-user fails to engage the messaging bot on the messaging conversation, the program instructions direct the processing system to prevent the messaging bot from communicating with the messaging client upon re-entry by the messaging client into the geographic area.

EXAMPLE 12

The apparatus of Examples 9-11 wherein, to control the subsequent access to the messaging client based on the level of engagement by the end-user, the program instructions direct the processing system to allow the messaging bot to communicate with the messaging client while the end-user remains engaged with the messaging conversation and until the end-user disengages from the messaging conversation.

EXAMPLE 13

The apparatus of Examples 9-12 wherein the program instructions further direct the processing system to, in response to when the messaging client has entered the geographic area, identify multiple messaging bots associated with the geographic area, identify the multiple messaging bots to the messaging client, and receive a selection of the messaging bot from the messaging client.

EXAMPLE 14

The apparatus of Examples 9-13 wherein the program instructions further direct the processing system to receive a plurality of requests to register the plurality of messaging bots with the access control service and, in response to each request of the plurality of requests, verify an association between the messaging bot and the geographic area indicated in the request.

EXAMPLE 15

The apparatus of Examples 9-14 wherein the program instructions further direct the processing system to, in response to the end-user engaging the messaging bot on the messaging conversation via the messaging client, add a contact to the messaging client for contacting the messaging bot.

EXAMPLE 16

The apparatus of Examples 9-15 wherein the program instructions further direct the processing system to identify the messaging client to the messaging bot by an alias with which to address messages sent during the messaging conversation to the messaging client.

EXAMPLE 17

An apparatus comprising: one or more computer readable storage media; and program instructions stored on the one or more computer readable storage media for operating a messaging client on a computing device that, when executed by a processing system on the computing device, direct the computing device to at least: report a location of the computing device to an access control service that associates a plurality of messaging bots with a plurality of geographic areas; receive a list of suggested messaging bots from the access control service that are associated with the location of the computing device; present the list of the suggested messaging bots in a user interface to the messaging client; and in response to a selection of a suggested messaging bot from the list of suggested messaging bots in the user interface, identify the suggested messaging bot to the access control service to grant the suggested messaging bot with access to the messaging client.

EXAMPLE 18

The apparatus of Example 17 wherein the program instructions further direct the computing device to add a contact for the suggested messaging bot to a set of contacts in response to the selection of the suggested messaging bot.

EXAMPLE 19

The apparatus of Examples 17-18 wherein the program instructions further direct the computing device to present an option in the user interface to prevent subsequent access to the messaging client by the messaging bot.

EXAMPLE 20

The apparatus of Examples 17-19 wherein, in response to another selection of the option in the user interface, the program instructions further direct the computing device to communicate a request to the access control service to prevent the subsequent access.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A method of operating a device for controlling location-based access by bots, the method comprising:
    monitoring a location of the device with respect to a plurality of geographic areas;
    detecting, based on the monitored location of the device, that the device has entered a first geographic area of the plurality of geographic areas;
    upon detecting that the device has entered the first geographic area, granting a first bot associated with the geographic area first access to the device, the first access granted to the first bot allowing the first bot to surface a first message via a user interface of the device;
    detecting that a user associated with the device has ignored or rejected the first message surfaced via the user interface of the device;
    detecting that the user has ignored or rejected the first message, (i) revoking the first access granted to the first bot; and (ii) granting a second bot associated with the first geographic area second access to the device, the second access granted to the second bot allowing the second bot to surface a second message via the user interface of the device.

2. The method of claim 1, wherein revoking the first access granted to the first bot comprises preventing the first bot from surfacing an additional message via the user interface of the device.

3. The method of claim 2, wherein preventing the first bot from surfacing an additional message via the user interface of the device comprises preventing the first bot from surfacing an additional message via the user interface of the device upon re-entry by the device into the first geographic area.

4. The method of claim 1, further comprising:
    in response to detecting that the device has entered the first geographic area, identifying a plurality of bots associated with the first geographic area; and
    selecting, from the plurality of identified bots, the first bot for granting the first access to the device.

5. The method of claim 1, further comprising:
    receiving a plurality of requests to register the first and second bots to the device; and
    verifying that the first and second bots are associated with the first geographic area.

6. The method of claim 1, further comprising, in response to the first access being granted to the first bot, adding the first bot as a contact to the device.

7. The method of claim 1, further comprising initiating a bidding process to select, from a plurality of bots associated with the first geographic area, the second bot.

8. A device comprising:
    a processor; and
    a memory in communication with the processor, the memory comprising executable instructions that, when executed by the processor, cause the processor to control the device to perform functions of:
- monitoring a location of the device with respect to a plurality of geographic areas;
- detecting, based on the monitored location of the device, that the device has entered a first geographic area of the plurality of the geographic areas;
- upon detecting that the device has entered the first geographic area, granting the first bot first access to the device, the first access granted to the first bot allowing the first bot to surface a first message via a user interface of the device;
- detecting that a user associated with the device has ignored or rejected the first message surfaced via the user interface of the device; and
- upon detecting that the user has ignored or rejected the first message, (i) revoking the first access granted to the first bot and (ii) granting a second bot associated with the first geographic area second access to the device, the second access granted to the second bot allowing the second bot to surface a second message via the user interface of the device.

9. The device of claim 8, wherein, for revoking the first access granted to the first bot, the instructions, when executed by the processor, further cause the processor to control the device to perform a function of preventing the first bot from surfacing an additional message via the user interface of the device.

10. The device of claim 9, wherein, for preventing the first bot from surfacing an additional message via the user interface of the device, the instructions, when executed by the processor, further cause the processor to control the device to perform a function of preventing the first bot from surfacing an additional message via the user interface of the device upon re-entry by the device into the first geographic area.

11. The device of claim 8, wherein the instructions, when executed by the processor, further cause the processor to control the device to perform functions of:
- in response to detecting that the device has entered the first geographic area, identifying a plurality of bots associated with the first geographic area; and
- selecting, from the plurality of identified bots, the first bot for granting the first access to the device.

12. The device of claim 8, wherein the instructions, when executed by the processor, further cause the processor to control the to perform functions of:
- receiving a plurality of requests to register the first and second of bots to the device; and
- verifying that the first and second bots are associated with the first geographic area.

13. The device of claim 8, wherein the instructions, when executed by the processor, further cause the processor to control the device to perform a function of adding, in response to the first access being granted to the first bot, adding the first bot as a contact to the device.

14. The device of claim 8, wherein the instructions, when executed by the processor, further cause the processor to control the device to perform a function of initiating a bidding process to select, from a plurality of bots associated with the first geographic area, the second bot.

15. A non-transitory computer readable medium containing instructions which, when executed by a processor, cause a device to perform functions of:
- monitoring a location of the device with respect to a plurality of geographic areas;
- detecting, based on the monitored location of the device, that the device has entered a first geographic area of the plurality of the geographic areas;
- upon detecting that the device has entered the first geographic area, granting a first bot first access to the device, the first access granted to the first bot allowing the first bot to surface a first message via a user interface of the device;
- detecting that a user associated with the device has ignored or rejected the first message surfaced via the user interface of the device; and
- upon detecting that the user has ignored or rejected the first message, (i) revoking the first access granted to the first bot and (ii) granting a second bot associated with the first geographic area second access to the device, the second access granted to the second bot allowing the second bot to surface a second message via the user interface of the device.

16. The non-transitory computer readable medium of claim 15, wherein, for revoking the first access granted to the first bot, the instructions, when executed by the processor, further cause the processor to control the device to perform a function of preventing the first bot from surfacing an additional message via the user interface of the device.

17. The non-transitory computer readable medium of claim 16, wherein the instructions, when executed by the processor, further cause the processor to control the device to perform functions of:
- in response to detecting that the device has entered the first geographic area, identifying a plurality of bots associated with the first geographic area; and
- selecting, from the plurality of identified bots, the first bot for granting the first access to the device.

18. The non-transitory computer readable medium of claim 15, wherein the instructions, when executed by the processor, further cause the processor to control the device to perform functions of:
- receiving a plurality of requests to register the first and second of bots to the device; and
- verifying that the first and second bots are associated with the first geographic area.

19. The non-transitory computer readable medium of claim 15, wherein the instructions, when executed by the processor, further cause the processor to control the device to perform a function of adding, in response to the first access being granted to the first bot, adding the first bot as a contact to the device.

20. The non-transitory computer readable medium of claim 15, wherein the instructions, when executed by the processor, further cause the processor to control the device to perform a function of initiating a bidding process to select, from a plurality of bots associated with the first geographic area, the second bot.

* * * * *